US005303631A

United States Patent [19]

Frehaut et al.

[11] Patent Number: 5,303,631

[45] Date of Patent: Apr. 19, 1994

[54] DAMPED-ACTION PYROTECHNIC ACTUATOR

[75] Inventors: Jean-Pierre Frehaut, Versailles; Daniel Wisshaupt, Orleans La Source, both of France

[73] Assignee: Thomson-Brandt Armements, La Ferte Saint Aubin, France

[21] Appl. No.: 995,822

[22] Filed: Dec. 23, 1992

[30] Foreign Application Priority Data

Dec. 31, 1991 [FR] France ............................... 91 16385

[51] Int. Cl.[5] ......................... F01B 29/08; B64D 1/04

[52] U.S. Cl. ....................................... 89/1.14; 60/637; 60/638

[58] Field of Search ................... 89/1.14; 60/632, 635, 60/637, 638; 91/404, 408

[56] References Cited

U.S. PATENT DOCUMENTS

| | | | |
|---|---|---|---|
| 2,892,452 | 6/1959 | Weinstock | 60/637 |
| 3,118,349 | 1/1964 | Combs | 60/635 |
| 3,149,456 | 9/1964 | Sterrett | 60/638 |
| 4,034,816 | 7/1977 | Lutich et al. | 60/637 |
| 4,037,821 | 7/1977 | Greene | 60/638 |
| 4,054,032 | 10/1977 | Patrichi | 60/632 |
| 4,237,690 | 12/1980 | Tsuge et al. | 60/635 |
| 4,412,420 | 11/1983 | Patrichi et al. | 60/635 |
| 4,753,151 | 6/1988 | Peterson | 89/1.14 |

FOREIGN PATENT DOCUMENTS

| | | |
|---|---|---|
| 3717458 | 12/1988 | Fed. Rep. of Germany . |
| 1582177 | 9/1969 | France . |
| 2489898 | 3/1982 | France . |
| 809031 | 2/1959 | United Kingdom . |

*Primary Examiner*—David H. Brown

*Attorney, Agent, or Firm*—Oblon, Spivak, McClelland, Maier & Neustadt

[57] ABSTRACT

The invention that relates to a pyrotechnic actuator in which the movement of the piston is damped. The actuator includes a body, a piston, a pyrotechnic material combustion chamber and a counter pressure chamber. The actuator also includes at least one intermediate compression chamber located between the combustion chamber and the end of the piston, with the intermediate compression chamber connected to the combustion chamber by a hole.

12 Claims, 2 Drawing Sheets

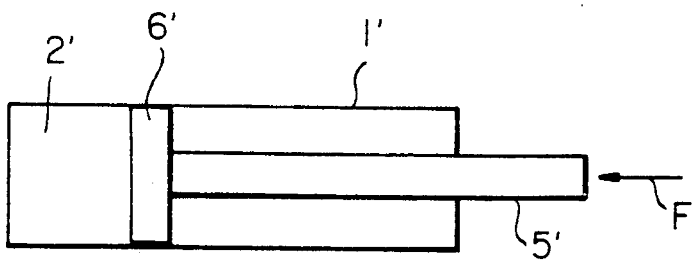
FIG. 1a
(PRIOR ART)
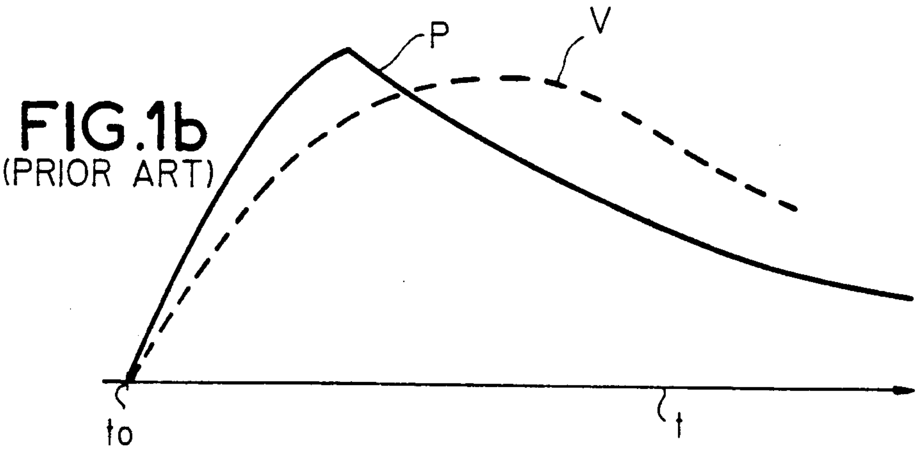
FIG. 1b
(PRIOR ART)
FIG. 2
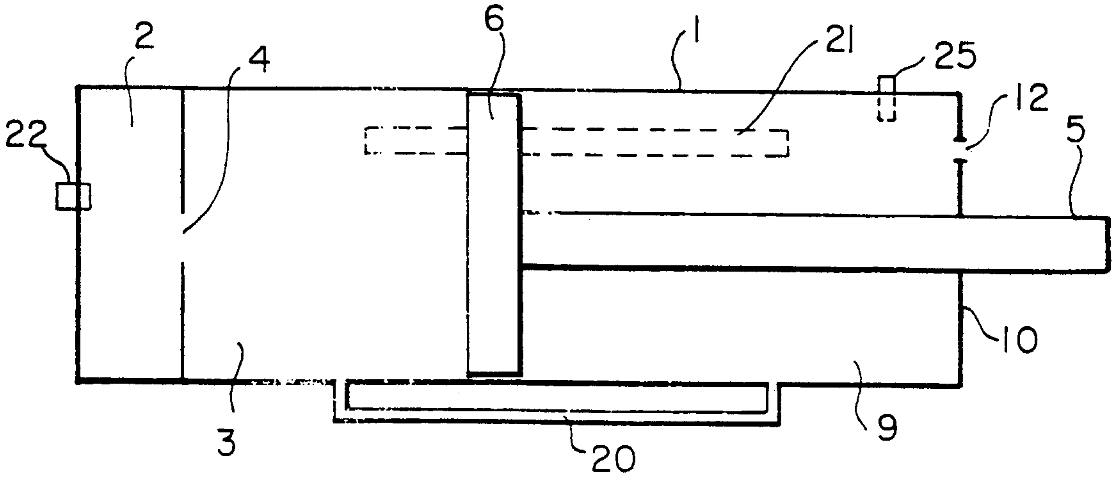

DAMPED-ACTION PYROTECHNIC ACTUATOR

BACKGROUND OF THE INVENTION

The present invention relates to a damped-action pyrotechnic actuator.

In particular, it relates to inclination actuators for ammunition suspended from a parachute, where the inclination is controlled by the action of an actuator on one of the shroud lines via a pulley for example. More generally, it relates to actuators where it is necessary to control or damp the displacement speed of the piston, and to maintain a high driving force right up to the limit of travel.

One of the disadvantages of pyrotechnic actuators is that the combustion of the pyrotechnic material causes a high initial pressure, as the piston starts its movement, which diminishes strongly as the piston reaches its limit of travel, the piston having acquired a high speed due in particular to the high initial pressure. As a result the piston strikes hard the stop at the limit of travel.

If, so as to avoid this impact, the pressure is reduced or the piston is braked there is a risk that the piston will not reach the stop position and will not be able to be locked in this position using the means provided for this purpose. This may be detrimental if, for example, the actuator must enable a device to attain a new stable position such that it continues to exert a compressive force on the actuator. This is the case for ammunition suspended from a parachute which must be inclined, if the inclination is controlled by the action of the actuator on one of the shroud lines under tension, for example.

SUMMARY OF THE INVENTION

The aim of the invention is to reduce the disadvantages described above. To this end, the invention relates to a pyrotechnic actuator having a body containing a piston, a pyrotechnic material combustion chamber, and a counter pressure chamber between the piston head and the far end of the actuator, characterized in that it includes an intermediate compression chamber between the combustion chamber and the piston head, the intermediate compression chamber being connected to the combustion chamber by a hole.

The principal advantages of the invention are that it enables the piston displacement speed to be damped, while maintaining a driving force right up until it reaches the stop, that it eradicates piston bounce and that it is simple to produce.

BRIEF DESCRIPTION OF THE DRAWINGS

Other characteristics of the invention will appear with the aid of the following description referring to the appended drawings which represent:

FIG. 1*a:* a synoptic diagram of a pyrotechnic actuator according to existing techniques;

FIG. 1*b:* typical observed curves of pressure in the combustion chamber and piston speed in a pyrotechnic actuator;

FIG. 2: a synoptic diagram of a specific embodiment of a pyrotechnic actuator according to the invention;

DESCRIPTION OF THE INVENTION

Figure 3:
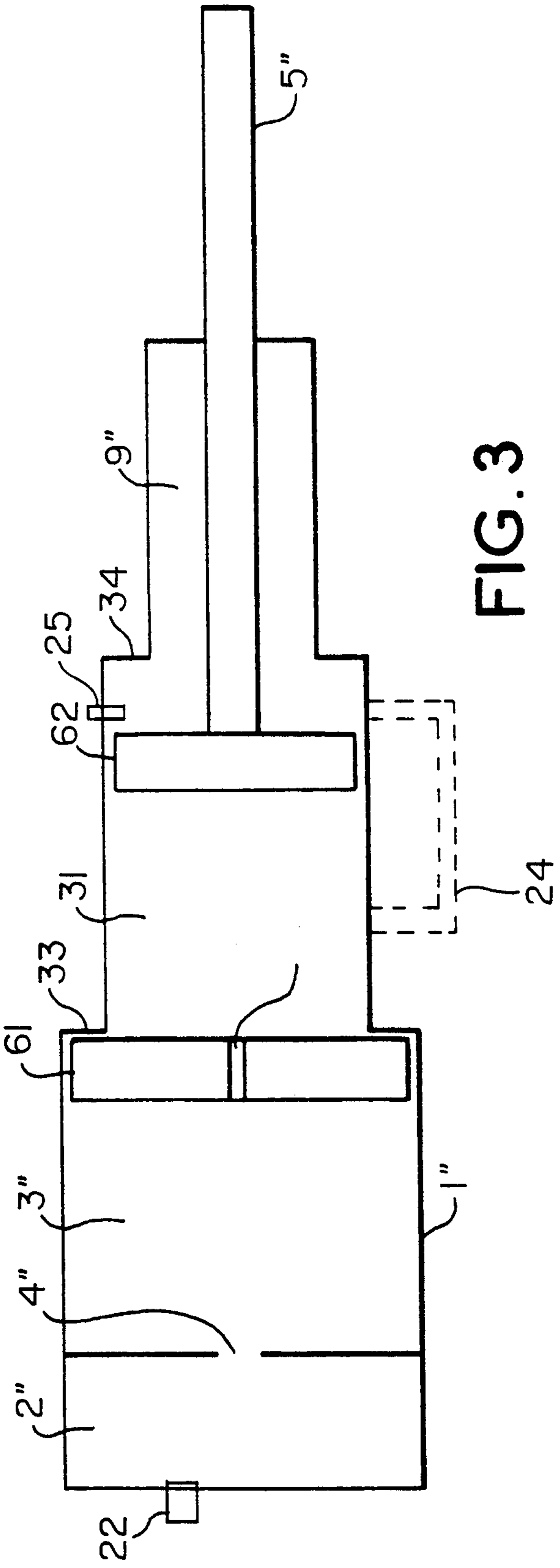
FIG. 3: a synoptic diagram of a specific embodiment of a pyrotechnic actuator according to the invention, with multiple compression chambers.

FIG. 1*a* is a synoptic diagram of a pyrotechnic actuator according to existing techniques. The actuator consists of a body 1' and a high pressure combustion chamber 2'. This chamber 2' is closed by the extremity or head 6' of the piston 5' of the actuator. As soon as the pyrotechnic material in the combustion chamber 2' ignites, the pressure in the chamber rises very rapidly, generating a force greater than the resisting force F of the piston and giving the piston a displacement speed which increases very rapidly.

FIG. 1*b* represents typically observed variations of pressure P in the combustion chamber 2' and speed V of the piston 5' as a function of time t after an initial time t0. For reasons of combustion regularity the combustion of the pyrotechnic material is of very short duration. The pressure P in the combustion chamber 2' reduces very rapidly whereas the speed V of the piston 5' increases very rapidly if the initial driving force generated by the combustion gases is sufficiently powerful. In certain cases the speed V of the piston 5' increases rapidly but then also decreases rapidly as a result of the reduction in the pressure P and the resisting force F of the piston 5' to such an extent that the piston 5' does not reach the position of the stop and as a result may not be able to be locked in place by the means provided for this purpose. This prevents the devices controlled by the actuator piston from attaining a stable position.

FIG. 2 is a synoptic diagram of an actuator according to the invention. The actuator still consists of a body 1, a combustion chamber 2 and a piston 5, but it also contains an intermediate compression chamber 3 between the combustion chamber 2 and the piston head 6. The intermediate compression chamber 3 is connected to the combustion chamber 2 by a hole 4. This hole may be a nozzle or regulating tube. Preferably, its throat should be designed so as to make it sonic, that is, in such a way as to ensure that the speed of the gas passing through it is equal to the speed of sound. The part 9 of the actuator between the head 6 of the piston 5 and the actuator end 10 opposite from the combustion chamber 2 consists of a counter pressure chamber 9. A gas-tight seal is maintained between the intermediate compression chamber 3 and the counter pressure chamber 9. This gas-tight seal may be obtained by fitting a rubber or elastomer seal around the piston head 6. The purpose of the intermediate compression chamber 3 is to avoid the sudden application of a large driving force to the piston. Effectively, the nozzle 4 causes a delay period before the gases arrive in the intermediate compression chamber 3 in contact with the piston 5. The nozzle 4 is designed in such a way that, taking into account the movement of the piston, the peak pressure in the intermediate compression chamber 3 will be less than in the actuator represented in FIG. 1*a*.

To further improve the smoothing out of the pressure in the intermediate compression chamber 3, it would be possible to introduce additional chambers between the chambers 2 and 3, separated by walls with holes similar to the existing hole 4 between the chambers 2 and 3 in FIG. 2. However, this could create practical manufacturing problems and the extra benefit remains limited, as the results obtained with only one intermediate compression chamber prove satisfactory for practical applications.

The piston 5 is subjected, via its head 6, to an essentially constant force by the pressure in the intermediate compression chamber 3 and to an opposing force by the pressure in the counter pressure chamber 9, which increases with the displacement of the actuator. These two forces give the piston 5 an essentially constant displacement speed, the movement being damped, unlike the case in FIG. 1*a*.

Additionally, the control of the piston displacement is increased by regulating the pressure in the counter pressure chamber 9 during the travel of the actuator using a gas passage 20 between the compression chamber 3 and the chamber 9, by-passing the gas-tight head 6 of the piston. The passage 20 may be a duct linking the two chambers, or, preferably a simple groove in the wall of the body 1 which traverses the seal of the piston head 6 as schematically represented in broken line at 21 in FIG. 2.

The section of the passage is adjusted so as to control the speed of the piston throughout its travel; it may be variable as a function of the piston position.

The end of the passage 20 is at a certain distance from the separation between the intermediate chamber and the combustion chamber so that the gas passage is inoperative at the start of piston displacement, so as not to affect the initial acceleration.

Similarly, in the counter pressure chamber 9, the gas passage 20 finishes before the end 10 of the actuator, so as to isolate the chamber 3 again towards the end of the travel.

It is preferable that the counter pressure chamber 9 is not absolutely gas-tight at the end 10 of the actuator: leakage from the chamber 9 ensures that at the limit of travel after the passage 20 has been closed the piston is driven right to the stop with a low speed, under the action of the high pressure in the chamber 3. Depending on the need to control the direction of the emitted gases, a leak 12 in the chamber 9 may be made where the piston rod 5 passes through the end 10, or by a nozzle through the end 10, or near the end of the body 1 close to the end 10. It should be noted that the quantity of gas to be evacuated is low, as the chamber 3 remains sealed near the limit of travel of the piston 5.

FIG. 3 represents another specific embodiment of the pyrotechnic actuator according to the invention. This contains several intermediate compression chambers 3", 31 of the same type as the first intermediate compression chamber 3, and a counter pressure chamber 9". The intermediate chambers 3", 31 may be formed, for example, by using a multi-stage piston assembly 5", and using actuator body 1" sections which decrease in steps 33, 34. The steps 33, 34 are to stop successively each part 61, 62 of the multi-stage piston assembly 5". One stopped, the parts 61, 62 with decreasing sections form internal walls, separating the first intermediate chamber 3" from the second intermediate chamber 31, and the second intermediate chamber 31 from the counter pressure chamber 9". A hole 41 similar to the hole 4 between the combustion chamber 2 and the first intermediate chamber 3 is incorporated in the part 61 separating the first intermediate chamber 3" from the second intermediate chamber 31, thus permitting the latter to be pressurized.

This last specific embodiment contains two intermediate chambers 3", 31. It is, however, possible to increase this number, the operating principles being analogous to those described by FIG. 3. Further, as represented by the broken line 24, the FIG. 3 embodiment may also include a by-pass gas passage connecting an intermediate chamber and a counter pressure chamber.

The combustion of pyrotechnic materials inside the combustion chamber 2 may, for example, be triggered by an electrically controlled initiator as represented schematically at 22 in FIGS. 2 and 3.

Finally, the actuator comprises the means for locking, not shown, to hold the piston assembly 5" against the stop according to techniques known to persons skilled in the art, for example, a finger (represented schematically at 25 in FIGS. 2 and 3) which engages with the piston when it reaches its limit of travel.

What is claimed is:

1. A pyrotechnic actuator having a body containing a piston, a pyrotechnic material combustion chamber, and a counter pressure chamber between a piston head and a mobile end of the actuator, also including an intermediate compression chamber between the combustion chamber and the piston head, the intermediate compression chamber being connected to the combustion chamber by a hole, and a gas passage by-passing the piston head of the piston to connect the intermediate chamber to the counter pressure chamber.

2. An actuator according to claim 1, the body containing a leak hole to the outside, this hole not communicating with the intermediate compression chamber during the piston travel and near the end of travel.

3. An actuator according to claim 1, wherein said gas passage includes first and second openings, and further wherein each of said first and second openings are downstream from said piston head with respect to a direction of travel of said piston head when said piston head is in a start position prior to combustion, and wherein each of said first and second openings are upstream from said piston head at an end position of said piston head after combustion.

4. An actuator according to claim 1, the gas passage being a groove extending parallel to the axis of the body.

5. An actuator according to claim 1, wherein the hole connecting the combustion chamber to the intermediate compression chamber is designed such that the speed of gas passing through said hole during combustion is equal to the speed of sound.

6. An actuator according to claim 1 comprising several intermediate compression chambers, obtained as a result of a multi-stage piston whose parts, with reducing diameters are successively stopped by steps incorporated into the actuator body, the parts forming internal walls which separate the chambers, with holes incorporated in the parts separating the intermediate chambers.

7. An actuator according to claim 1 also comprising locking means to hold the piston against its end-of-travel stop.

8. An actuator according to claim 1, further including an electrically controlled initiator for triggering combustion of pyrotechnic materials in the combustion chamber.

9. The pyrotechnic actuator of claim 1, wherein said combustion chamber, intermediate compression chamber and counter pressure chamber are respectively and successively disposed along an axial length of said body.

10. A pyrotechnic actuator comprising:

a body containing a piston assembly;

a pyrotechnic material combustion chamber;

a counter pressure chamber located between the piston assembly and an end of the actuator; and an intermediate compression chamber between the combustion chamber and the counter pressure chamber, the intermediate compression chamber connected to the combustion chamber by a hole;

wherein said body has a stepped configuration such that at least one of said counter pressure chamber and said intermediate compression chamber has a diameter smaller than a diameter of said combustion chamber.

11. The actuator of claim 10, wherein said piston assembly is a multi-stage piston assembly, and wherein a first part of said multi-stage piston assembly is connected to a piston rod, and further wherein a second part of said multi-stage piston assembly includes a hole extending therethrough, and wherein said second part is movably disposed within said intermediate compression chamber.

12. The actuator of claim 11, wherein said intermediate chamber in which said second part is disposed provides a first intermediate compression chamber, said actuator further including a second intermediate compression chamber, said second intermediate compression chamber having a diameter smaller than said first intermediate compression chamber, and wherein said first part of said piston assembly is movably disposed within said second intermediate compression chamber.

* * * * *